US008968573B2

(12) United States Patent
Barnstrom

(10) Patent No.: US 8,968,573 B2
(45) Date of Patent: Mar. 3, 2015

(54) METHOD FOR CLEANING HYDRAULIC LIQUID, COMPUTERPROGRAM PRODUCT, CONTROL UNIT, AND INDUSTRIAL TRUCK

(75) Inventor: Joakim Barnstrom, Ljungsbro (SE)

(73) Assignee: BT Products AB, Mjolby (SE)

( * ) Notice: Subject to any disclaimer, the term of this patent is extended or adjusted under 35 U.S.C. 154(b) by 1048 days.

(21) Appl. No.: 13/011,095

(22) Filed: Jan. 21, 2011

(65) Prior Publication Data

US 2011/0180486 A1 Jul. 28, 2011

(30) Foreign Application Priority Data

Jan. 25, 2010 (SE) ...................................... 1050076

(51) Int. Cl.

| | |
|---|---|
| ***C02F 1/00*** | (2006.01) |
| ***F04B 9/08*** | (2006.01) |
| ***B62D 5/00*** | (2006.01) |
| ***B66F 9/22*** | (2006.01) |
| *F15B 21/04* | (2006.01) |

(52) U.S. Cl.

CPC *B66F 9/22* (2013.01); *F15B 21/041* (2013.01)
USPC ........... 210/739; 210/765; 210/194; 417/390; 180/442

(58) Field of Classification Search

USPC .......................................................... 417/390
See application file for complete search history.

(56) References Cited

U.S. PATENT DOCUMENTS 4,126,038 A * 11/1978 Bartlett et al. ............. 73/115.01
4,873,880 A * 10/1989 Amedei et al. .............. 74/336 R
4,876,015 A * 10/1989 McKibben .................... 210/695
5,222,875 A * 6/1993 Clark ............................ 417/390
2007/0295005 A1 12/2007 Fleischmann

FOREIGN PATENT DOCUMENTS

JP 6081815 3/1994
JP 2005104392 4/2005

* cited by examiner

*Primary Examiner* — Nam Nguyen
*Assistant Examiner* — Richard Gurtowski
(74) *Attorney, Agent, or Firm* — Renner, Otto, Boisselle & Sklar, LLP

(57) ABSTRACT

Method for cleaning hydraulic liquid in a industrial truck, wherein said industrial truck is an electrically powered industrial truck having a battery as an energy source with a hydraulic system comprising, a hydraulic pump, a hydraulic reservoir, and a return pipe to the hydraulic reservoir with a return filter, wherein the method comprises the steps of, the hydraulic pump is activated for hydraulic activity, the hydraulic pump pumps the liquid for the hydraulic activity and in relation to this return flow through the return filter to the hydraulic reservoir occurs, the hydraulic pump can be activated by means comprised in the industrial truck, when hydraulic activity is not present, by that achieving a circulation to the hydraulic reservoir through the return filter such that sufficient filtration of the hydraulic liquid is reached, further a time Tb for circulation without hydraulic activity can be accumulated and/or a sensor for determining the quality of the hydraulic oil can be arranged in the industrial truck. Termination of the circulation is based on Tb and/or the measured quality. The application also relates to a computer program product, a control unit and an industrial truck that can perform the method.

14 Claims, 4 Drawing Sheets

METHOD FOR CLEANING HYDRAULIC LIQUID, COMPUTERPROGRAM PRODUCT, CONTROL UNIT, AND INDUSTRIAL TRUCK

TECHNICAL AREA

The present invention relates to the area of industrial trucks. More specifically to the hydraulic system in industrial trucks cleaning of hydraulic liquid.

In particular the present invention relates to electrically driven industrial trucks, using a battery as a power source.

BACKGROUND

It is previously known to clean hydraulic liquid in industrial trucks.

Hydraulic systems in general, have an incorporated filter which is positioned at the return flow to a container for the hydraulic liquid, generally named the hydraulic reservoir. This filter is of low pressure type. The filter cleans the liquid by means of the return flow to the hydraulic reservoir. In JP 6081815 A, such a hydraulic circuit is disclosed, in which the idea of cleaning with a low pressure filter at the hydraulic reservoir has been further developed. JP 6081815 A discloses a hydraulic circuit with a pump, two hydraulic pistons, the hydraulic circuit presents further two direction change valves which are maneuvered by two magnetic valves. The hydraulic circuit comprises a return pipe that conducts hydraulic liquid back to the hydraulic reservoir on the return pipe is positioned a return filter. The circuit includes a main pump and a control pump. In the circuit of the control pump is installed a filter on the pressure side, to increase the cleaning and for example lower the wear of the valves. By this it has been solved the problem of lowering the wear of the valves and achieves an increased cleaning, at the same time as the filter does not clog in the same manner as if the filter had been coupled on the main circuit.

The know (prior) art for improved cleaning of hydraulic circuits, in addition to what is provided by the return filter, is in other words built on introducing a high pressure filter on the pressure side of the pump. These filters provide problems with pressure losses from the pump, and result in increased costs for the hydraulic circuit. To introduce a high pressure filter on the pressure side after the pump also confers spacing problems.

The solution to at least one of these problems is presented below.

SUMMARY OF THE INVENTION

To solve the problem above it is hereby given a method, for cleaning hydraulic liquid in an industrial truck, wherein said industrial truck is an electrically powered industrial truck having a battery as an energy source, further comprising a hydraulic system comprising, a hydraulic pump, a hydraulic reservoir, a return pipe to the hydraulic reservoir with a return filter, wherein the method comprises the steps of:

a. the hydraulic pump activates for hydraulic activity b. the hydraulic pump pumps the hydraulic liquid for the hydraulic activity and in relation to this a return flow occurs through the return filter to the hydraulic reservoir wherein further is comprised that, c. the hydraulic pump can be activated by means comprised in the industrial truck, when hydraulic activity is not present, to by that achieve circulation through the hydraulic tank through the return filter such that sufficient filtration of the hydraulic liquid is achieved wherein the industrial truck is arranged to accumulate a time Tb for accumulated circulation time without hydraulic activity, and that sufficient cleaning is determined automatically by the industrial truck in a step according to the following:

h. sufficient purity has been achieved when the industrial truck reaches a predetermined value of accumulated Tb and/or wherein the industrial truck is arranged to perform the following steps, with a in the industrial truck arranged sensor for measurement of the quality of the hydraulic liquid:

m. determine automatically that sufficient purity has been reached, during circulation without hydraulic activity, based on that a predetermined condition A for the quality of the hydraulic liquid has been fulfilled, and wherein the industrial truck is arranged to perform the following steps when sufficient purity is reached by attaining the said predetermined value of Tb and/or when the predetermined sensor measured condition A for the quality of the hydraulic liquid has been fulfilled:

n. terminate circulation with the hydraulic pump without hydraulic activity.

The effect of this method is thereby that a better cleaning of the hydraulic liquid can occur, through filtration in the return filter, in addition to the filtration that occurs at normal usage of the hydraulic system in the industrial truck.

By activation should be understood that the hydraulic pump is either started from a standstill, alternatively is allowed to continue its operation after the occurrence of hydraulic activity.

The effect of the accumulation of Tb is that the industrial truck through the predetermined value Tb can be arranged to achieve a certain estimated quality of the hydraulic liquid, without further installations on the industrial truck.

The accumulation of Tb also allows the industrial truck to economise the energy usage and provides the possibility to save energy, for example compared to an automated circulation that is essentially always present when no hydraulic activity.

The effect of using a sensor for determining the quality of the hydraulic liquid is that the industrial truck has a more precise criterion to establish the quality of the hydraulic liquid, cleaning, as an effect of the performed circulation without hydraulic activity, and thereby the industrial truck is able to more precisely determine when the cleaning should be terminated.

It will also be possible to more precisely control the cleaning, and thereby also save energy, so that cleaning without hydraulic activity is not performed if not needed.

The effect of that the industrial truck itself can terminate the cleaning process, saves energy, lowers noise etc.

In particular it is important with the area of electrically driven industrial trucks with a battery as an energy source to save energy. Therefore it's important, that the cleaning/circulation are not performed when not needed.

According to an embodiment the industrial truck is arranged to automatically determine that the cleaning of the hydraulic liquid in hydraulic activity is not sufficient.

The effect of this is that the industrial truck can maintain a certain quality of the hydraulic liquid without the involvement of the operator. The process will also become similar for different operators. Thereby it is facilitated to schedule service occasions. It will also become easier to plan life expectancy for components in the hydraulic system.

A further advantage of this is that it opens up for a much better energy economy in the said industrial truck. This provides for that the hydraulic liquid is not always cleaned when hydraulic activity is not present.

According to an embodiment the industrial truck is arranged to perform the following steps; accumulate a time Ta for hydraulic activity and in a step; determine that Ta has achieved a predetermined value, and based on this the industrial truck determines automatically that the hydraulic liquid is not cleaned sufficiently by return flow, in hydraulic activity.

This has the effect that the quality of the hydraulic liquid can be determined by a criterion that does not require direct access to the hydraulic liquid. It also gives a good opportunity for adapting the intervals of cleaning.

According to an embodiment the industrial truck is arranged to perform the flowing steps automatically when the hydraulic liquid is not sufficiently cleaned; activate the hydraulic pump for circulation without hydraulic activity, through the return filter, for cleaning of the hydraulic liquid; reset Ta.

This has the effect that the industrial truck automatically can start the cleaning of the hydraulic liquid. This is an advantage when the operator has difficulties to himself determine the need for cleaning.

One further advantage is that the industrial truck is by this arranged to not clean at all moments, when hydraulic activity is not present. The truck will then be more efficient energy-wise.

According to an embodiment the industrial truck is arranged to perform the following step when sufficient purity has been achieved, reset Tb This has the effect that the industrial truck terminates circulation without hydraulic activity, and also that the industrial truck is ready to start a new cycle of cleaning immediately when a cycle is terminated.

According to an embodiment the industrial truck is arranged to perform the following steps; with an in the industrial truck arranged sensor for measuring the oil quality, measuring of the hydraulic liquid quality. The industrial truck is further arranged to perform the step; determining that a predetermined condition B for the hydraulic liquids quality is achieved, wherein determining automatically that the hydraulic liquid is not sufficiently cleaned by return flow at hydraulic quality and thereby activate the hydraulic pump for circulation without hydraulic activity. The said predetermined condition B is preferably larger in amount than the condition A.

The effect of this is that the industrial truck can use a more precise criteria than Ta to determine if the hydraulic liquid demands extra cleaning.

The sensor can also combine the measured values with Ta for a more flexible arrangement of the industrial truck. For example Ta is used as a coarse measure, and the sensor being used in a consecutive for a more precise determination, for example.

According to an embodiment the sensor is arranged to measure the particle content of the hydraulic liquid and the predetermined conditions A, B for the quality of the hydraulic liquid is represented by a particle content value.

According to an embodiment the industrial truck is arranged to only allow circulation without hydraulic activity, if the travel function is activated.

This has the effect that the circulation process does not disturb the operator, sound wise. Noise from the circulation process will for example not disturb if the industrial truck is parked close to an area where noise can be a problem, for example when used in a supermarket, office environment or the like. Additionally the hydraulic function is usually not activated at the same time as the travel function, in which way it does not disturb the cleaning, and it can be performed without to many interruptions.

The invention also comprises a computer program product comprising machine readable code which when executed in an industrial truck control unit makes the industrial truck perform the method according to the above. The invention further comprises a control unit that comprises the computer program product. The control unit can according to an embodiment constitute an own unit outside a central truck computer. This has the effect that the control unit can in easily be serviced or exchanged. Different control units can easily be adapted depending on how the industrial truck is used, and adaptations can be made also of the control unit's hardware in a convenient way. The control unit can according to an embodiment be integrated in a central truck computer. This has the effect that no additional electronics need to be installed on the industrial truck.

The invention also concerns an industrial truck that is arranged to be able to perform the method according to the above by means of a computer program product according to the above and a control unit according to the above.

According to an embodiment the industrial truck can be arranged in such a way that activation of the hydraulic pump for circulation without hydraulic activity, can occur manually.

The effect of this is that an operator can on his own accord determine if cleaning of the hydraulic liquid is demanded. It can also be a service technician that makes the determination.

According to an embodiment of the industrial truck the manual activation of the hydraulic pump is arranged to occur through a device on the control panel.

The effect of this is a simplification for an operator to manually activate the hydraulic pump for cleaning according to the method.

According to an embodiment the industrial truck can comprise a sensor for measurement of the quality of the hydraulic liquid.

According to an embodiment the comprised sensor is a particle content meter.

DETAILED DESCRIPTION

The invention is now described according to the annexed drawings.

Figure 1:
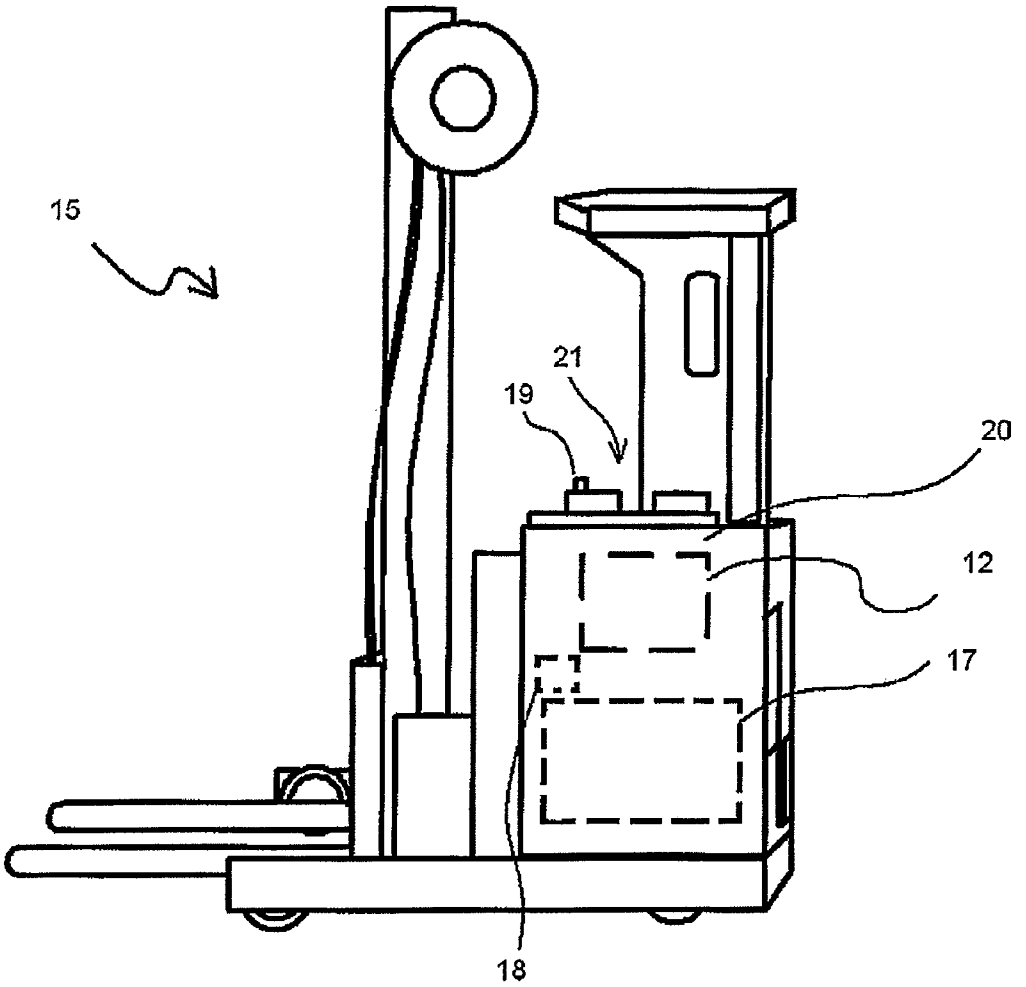
FIG. 1 Industrial truck according to the invention

The method according to the invention consists of performing cleaning of the hydraulic liquid in an industrial truck 15, see FIG. 1. The cleaning is performed by introducing circulation of the hydraulic liquid when hydraulic activity is not present. This occurs by arranging the industrial truck 15 with means for performing this. The industrial truck 15 comprises a hydraulic pump 10, a hydraulic reservoir 11, and a return pipe to the hydraulic reservoir 11. On the return pipe a return filter 3 is positioned. The industrial truck is an electrically powered industrial truck 15 having a battery 17 as an energy source The steps of the method is given by the known process for step a and b, where a. The hydraulic pump 10 is activated for hydraulic activity b. The hydraulic pump 10 pumps the hydraulic liquid for the hydraulic activity and in relation to this return flow occurs through the return filter 3 to the hydraulic reservoir 11.

To this is added a step c where the hydraulic pump 10 can be activated by means comprised in the industrial truck 15, when hydraulic activity is not present, by means of which is achieved a circulation to the hydraulic reservoir 11 through the return filter 2 so that sufficient filtration of the hydraulic liquid is achieved.

Figure 4:
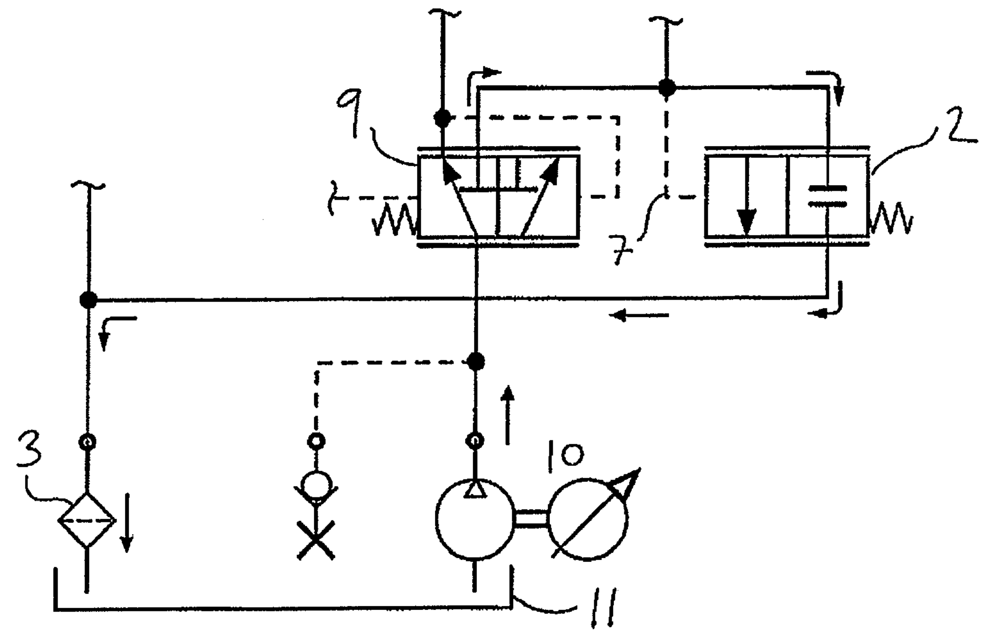
FIG. 4 Example of a circulation path in a hydraulic scheme.

Thus the hydraulic pump 10 can be activated when hydraulic activity is no present. This occurs when the hydraulic liquid is circulated in the hydraulic system. The circulation occurs with a hydraulic pump 10. The pump 10 pumps liquid from the hydraulic reservoir 11 in a circulation that returns to the hydraulic reservoir 11. The liquid passes a filter 3. The filter 3 is termed return filter. The path of the liquid through the hydraulic system at circulation is established in a known manner to the person skilled in the art. Preferably the circulation occurs via a shunt valve from the hydraulic reservoir 11 to the return filter to the hydraulic reservoir. By activation should be understood that the hydraulic pump 10 is either started from a stand still, alternatively is allowed to continue its operation after presence of hydraulic activity. See also FIG. 4.

The return filter 2 is of low pressure typ. With low pressure is meant pressure in the interval of 0-1 Mpa. To use a low pressure filter is cost efficient, as opposed to high pressure filters that must be able to withstand a pressure that can be 100 times higher than what is demanded for the low pressure filter.

With hydraulic activity in the above should be understood that the hydraulic system of the industrial truck 15 is active for hydraulic function. I.e. hydraulic activity in this context should be understood as, the time moments where the hydraulic system is operating actively, or passively, in the purpose of performing work with a hydraulic cylinder. With actively is thus meant that hydraulic cylinders are fed with hydraulic liquid, or are evacuated of hydraulic liquid. With passive is meant that the pump is operating prior, in between and just after that work is performed in the system. Common stages that are meant by hydraulic activity are, lifting and lowering movements, tilting, fork spreading etc. At hydraulic activity, the excessive hydraulic liquid flows back to the hydraulic reservoir 11 through the return filter 3. Whereby cleaning of the hydraulic liquid at hydraulic activity occurs.

By hydraulic liquid is meant all liquids that are usable in hydraulic systems, such as hydraulic oil, but also other liquids that are usable in the hydraulic system is comprised.

With hydraulic pump 10 is meant a mechanical pumping device. It can have an incorporated drive or an external drive. Commonly an external pump engine drives the hydraulic pump 10. The pump motor is usually electrically driven. The hydraulic pump 10 can be a gear pump or other suitable pump.

The hydraulic reservoir 11 is a container in the industrial truck 15 in which the hydraulic liquid is stored. The hydraulic reservoir 11 is usually made of plastic. The hydraulic reservoir 11 can nevertheless be made of any suitable material. The hydraulic reservoir 11 usually has an airing device.

The method comprises an automatic determination that sufficient cleanness has been reached of the hydraulic liquid. The industrial truck 15 can be arranged to allow circulation through the return filter 3 continue a predetermined time Tb. Tb is accumulated by the industrial truck 15 until it reaches the predetermined value. Tb is preferably 15 seconds. Tb can also adopt other values, as for example 5, 10, 20, 25, 30 seconds and values between these. Tb can also adopt values outside the given range as for example 40 seconds, 1 minute, 2 minutes, 5 minutes, and 10 minutes. Longer times give a more efficient cleaning, while shorter times saves energy and pumping equipment and lowers noise. The choice of the value of Tb depends on the cleanness of the hydraulic liquid that is required after terminated circulation. Longer time gives cleaner hydraulic liquid. Tb can also adobt an alternating value. I.e. Tb need not have the same value from one occasion to another. Tb can for example, have a value that is lower every third time etc. Preferably the industrial truck 15 is arranged to make a pause in the accumulation of Tb, if hydraulic activity is initiated. When the hydraulic activity is terminated the industrial truck 15 is preferably arranged to resume circulation of hydraulic oil and also accumulation of Tb. Tb can also adopt different values depending of how it has been determined that circulation of hydraulic liquid without hydraulic activity shall continue. For example Tb can adopt a lower value if the initiation has occurred manually.

The industrial truck 15 can also be arranged to determine that the hydraulic liquid is sufficiently cleaned by circulation without hydraulic activity, based on measurement of the quality of the hydraulic by means of a sensor 18. This can be performed by the industrial truck 15 for example based on that a condition A for the particle content has been reached for example, a reached lowest predetermined value for the particle content. The condition A can also be constituted of a predetermined lowest number of particles in the hydraulic liquid. It can also be a predetermined value of the refractive index that corresponds to a sufficiently cleaned hydraulic liquid.

When the industrial truck 15 has received indication, through a predetermined value of Tb or reached quality condition A based on a measurement on the hydraulic liquid that the hydraulic liquid is sufficiently cleaned, the industrial truck 15 is preferably arranged to automatically terminate the cleaning through circulation through the return filter 3 without hydraulic activity.

When the criteria for sufficient cleanness of the hydraulic liquid are reached, then the circulation without hydraulic activity is terminated. If Tb has been used in the method the industrial truck 15 is arranged to then reset Tb.

The usage of a termination criterion for the circulation without hydraulic quality is important for energy saving reasons in electrically powered industrial trucks.

The industrial truck 15 can further be arranged to combine the sensors 18 measured result with a time Tb for accumulated circulation time through the return filter 3 without hydraulic activity, and based on this the industrial truck 15 determines when the circulation shall be terminated.

The termination of the circulation without hydraulic activity is an important part of the invention. In a further development, the circulation can continue a time period Tb and thereafter a measurement of the sensor 18 occurs, if a predetermined value, predetermined condition A, has not been reached Tb can be reset and the circulation can be allowed for a subsequent time period Tb.

According to one embodiment the termination of the circulation without hydraulic activity is solely based on the measurement of the quality of the hydraulic liquid by the said sensor 18.

The activation of the hydraulic pump 10 can according to a variant occur manually. With manual activation of the hydraulic pump 10 the circulation can be allowed to continue until a manual deactivation commando is obtained. However the manual deactivation is preferably only allowed within a predetermined time interval, preferably within a predetermined time Tb. Due to the fact that if the operator doesn't give the deactivation command the industrial truck will continue with circulation of the hydraulic liquid without hydraulic activity. This situation is not desirable since the energy saving is important in an electrical industrial truck.

Preferably the hydraulic pump 10 is activated by a device 19 that is arranged on the industrial truck's 15 control panel. This device 19 can preferably be a dedicated button, or another manually operable device, such as a bar, or a wheel or the like. The industrial truck 15 can be arranged so that when manual activation has occurred the circulation of hydraulic oil through the return filter 3 continues a predetermined time Tb. With manual activation of the hydraulic pump 10, shall not only be understood manual start of the hydraulic pump 10. Activation means according to above, that the hydraulic pump 10 either is started, or is allowed to continue its operation after hydraulic activity.

It should also be understood that manual activation is to be interpreted as a start command for the method of cleaning is given manually by the operator.

The industrial truck 15 according to an embodiment is thus equipped for manual starting up of the hydraulic pump 10 for circulation without hydraulic activity. Then the industrial truck 15 is equipped with a device 19 on the industrial truck 15 to perform this, which has been said in relation to the method above. It can also be a button, a bar or the like. Preferably the device 19 is arranged on the control panel, easy accessible for the operator of the industrial truck 15. Other positions are possible for the device 19.

Activation of the hydraulic pump 10 can occur automatically. The industrial truck 15 can be arranged to automatically determine whether the cleaning of the hydraulic liquid at hydraulic activity is not sufficient. This can occur in several different ways. One way for the industrial truck 15 to determine that the hydraulic liquid has not been sufficiently cleaned at hydraulic activity, is that the industrial truck 15 registers a time Ta for hydraulic activity. Ta is accumulated continuously at hydraulic activity, when Ta achieves a predetermined value, then the industrial truck determines, supported by this value that the hydraulic liquid needs to be cleaned. The cleaning of the hydraulic liquid is performed by the hydraulic pump 10 being allowed to be activated to circulate the hydraulic liquid through the return filter 3, without occurrence of hydraulic activity, in the case of the hydraulic pump 10 has already been activated by prior hydraulic activity. The hydraulic pump 15 can also be at a standstill after hydraulic activity, in that case the industrial truck 15 is arranged to activate the hydraulic pump 10 for circulation through the return filter 3. At activation of the hydraulic pump 10 for circulation without hydraulic activity the industrial truck 15 can be arranged to reset Ta. Ta can remain zero during ongoing circulation from hydraulic activity. Ta is preferably 15 min, but other values for Ta are of course thinkable as 1 min, at large cleaning demand and 30 min, at lower cleaning demand, times between 0.5 min and 60 minutes are thinkable. Too long times result in that the cleaning is not sufficient, while too short times for Ta infer losses, and wear on hydraulic pump and equipment, unnecessarily. Ta is measured as an accumulated time.

The hydraulic pump 10 can also be activated, for circulation, through the in the industrial truck 15 arranged sensor 18 for measuring the quality of the oil. The sensor 18 preferably measures the particle content in the hydraulic oil. When a condition B for the particle content has been met, the industrial truck 15 is arranged to activate the hydraulic pump 10 for circulation without hydraulic activity. The condition B is generally that a predetermined value of the particle content has been reached. The condition can be adapted after the operational circumstances, the total operation time for the hydraulic liquid and the like. The sensor 18 may be a particle counter, and the condition B that then is reached is that a certain number of particles have been reached. Other sensors 18 are possible, for example a meter for the hydraulic liquid refraction index. When the conditions according to the above are reached the industrial truck 15 determines automatically that the hydraulic liquid is not sufficiently cleaned. The predetermined condition B of the quality of the hydraulic oil is preferably a value of the particle content that is larger than the mentioned condition A.

The industrial truck 15 comprises thus according to an embodiment a sensor 18 according to the above.

According to an alternative the determination by the industrial truck 15 that the liquid needs to be cleaned, can be based on other criteria that can be, accumulated weight that has been lifted, number of lifting movements, and the like. In these cases a circulation occurs without hydraulic activity preferably during a predetermined time period Tb according to the above.

According to an alternative the industrial truck 15 can determine that the circulation of hydraulic liquid without hydraulic activity shall occur, based on that the industrial truck 15 has been shut off. I.e. the industrial truck 15 is then arranged to recognize that a starting of the truck has occurred and this is then a criteria for performing the method. According to a further development the industrial truck 15 is arranged to determine that if circulation without hydraulic activity shall occur based on how long time period that the industrial truck 15 has been shut off.

According to an alternative embodiment the industrial truck 15 is arranged to, combine the sensor's 18 measured results with a time Ta for hydraulic activity, so that through a combination of these determine that if, cleaning of the hydraulic liquid with circulation through the return filter without hydraulic activity, shall occur, as mentioned above. For example the industrial truck 15 can allow the sensor 18 to measure at first, after that Ta has been reached, and if the measurement does not reach a predetermined value Ta can be reset and a new accumulation of Ta is allowed to occur. The accumulation of Ta and the sensor 18 could be made in parallel. The accumulation of Ta and the sensor 18 could be made in a consecutive manner as mentioned above, where Ta is used by the industrial truck for a rough estimate of the purity of the hydraulic liquid, and where the sensor 18 if Ta has reached a certain value, provides measurement of the quality of the hydraulic liquid.

According to a further development of the invention cleaning is only allowed to continue if the travel function is activated. Travel function is defined in this context by that the industrial truck's 15 wheels are moving alternatively that the propulsion motor is active. The effect of this is primarily that the comfort of the industrial truck 15 is raised. The operation of the pump motor does not disturb for example if the operator has stopped. It also has the effect that that time is utilized that generally is not used by other hydraulic functions. Thereby the number of pauses in the cleaning is minimized. This in turn has the effect that the cleaning process total time is lowered, which augments the likelihood of the cleaning being terminated before the industrial truck 15 has terminated its usage and is turned off.

Figure 2:
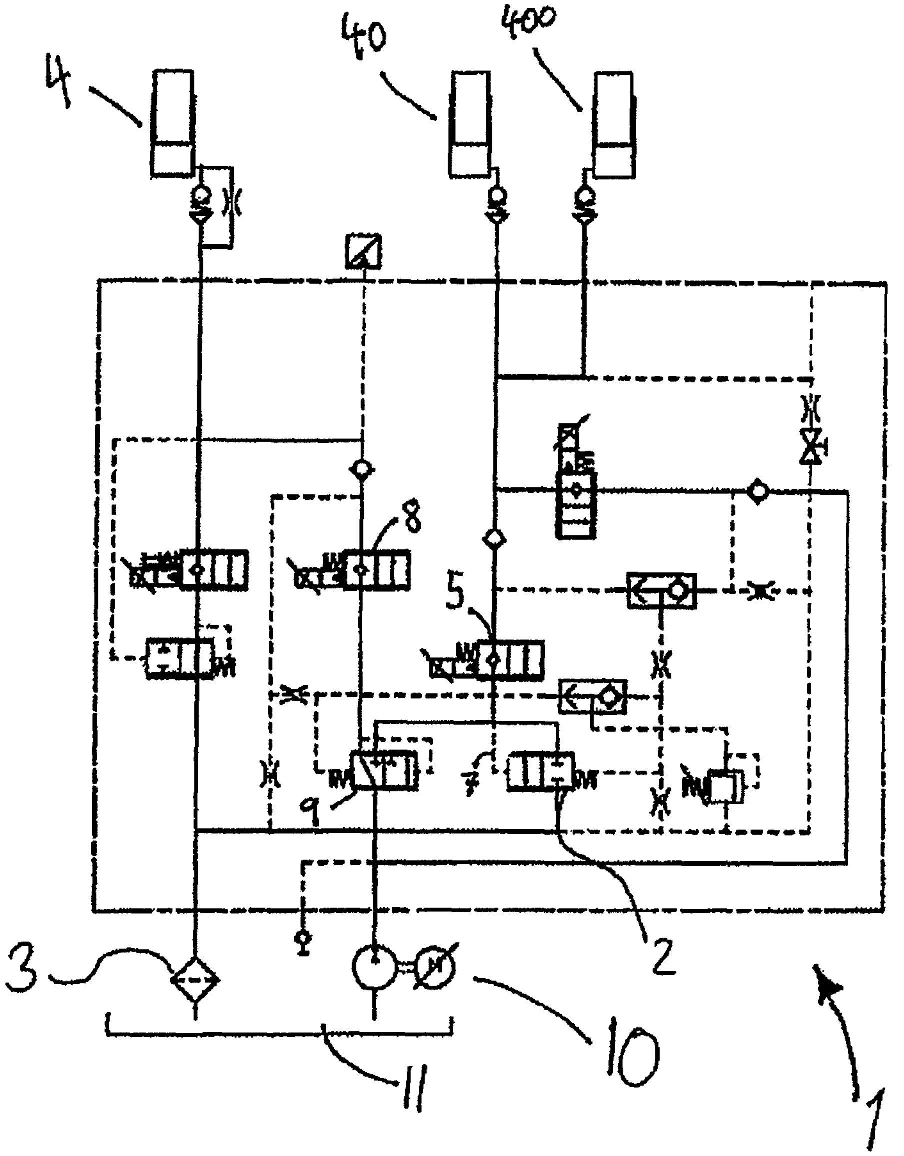
FIG. 2 Hydraulic scheme of an industrial truck according to the invention

An example of a hydraulic system 1 in an industrial truck is shown in FIG. 2. In this is included a hydraulic liquid pump 10, a shunt valve 2, a return filter 3, hydraulic pistons 4, 40, 400 for the load handling section. The hydraulic liquid pump 10 is driven by an electrical motor.

In the hydraulic system there is a plurality of valves to regulate the flow of hydraulic liquid to the different parts of the system. The valves are preferably integrated into a valve bloc that constitutes a unity. The valve bloc is generally made of steel or aluminium, where drilled channels connect the different components. In a hydraulic system according to FIG. 2 there are several possible circulation paths for the hydraulic liquid. Here is described a circulation path for the hydraulic liquid at circulation without hydraulic activity. The hydraulic pump 10 is activated or is activated by prior hydraulic activity. A first valve 8 is closed, whereby the pressure rises in the dashed line 7 up to the shunt valve 2 that opens. The hydraulic liquid can now circulate from the hydraulic pump 10 via the priority valve 9 to the shunt valve 2 and further to the return filter 3, to the hydraulic reservoir 11. From the hydraulic reservoir 11 the hydraulic pump 10 fetches new hydraulic liquid and the circulation of hydraulic liquid can continue. At hydraulic activity for example one of the lift valves 5 is opened and then the pressure on the shunt valve 2 is lowered, which thereby closes due to spring-load action, and the circulation performs a pause until the hydraulic activity is terminated. Se also FIG. 4 for the circulation path itself.

The shunt valve 2 is preferably a pilot controlled valve that is controlled by the load pressure put onto it, a spring holds it in a closed position.

The industrial truck 15 comprises preferably means which comprises a computer program product comprising computer readable code which when executed in an industrial truck 15 intended means in the industrial truck 15 makes the industrial truck 15 perform the described method. Preferably the machine readable code is executed in a control unit 12 in the industrial truck 15.

The industrial truck 15 preferably has a control unit 12 that is arranged to perform and control the cleaning of the hydraulic liquid. When stated above in the description that the industrial truck 15 is arranged and the like it should be understood that it is preferably the control unit comprised in the industrial truck that performs this. The control unit 12 is arranged to accumulate Ta. The control unit 12 is arranged to be able to determine if Ta has reached a predetermined value. The control unit 12 is arranged to accumulate Tb. The control unit 12 is arranged to be able to control the cleaning process, and determine whether a predetermined value of Tb has been reached. The control unit 12 is arranged to interpret signals from a sensor 18 that measures the quality of the hydraulic liquid, preferably the particle content. The control unit 12 is arranged to be able to control if the particle content has reached a predetermined value, such as a highest or lowest value. The control unit 12 is preferably programmable. The control unit 12 can in one embodiment be constituted by an own unit. The control unit 12 is preferably a part of a central industrial truck computer 20.

By other words it is the control unit 12 that continuously monitors whether hydraulic activity is present. This can occur through monitoring if commands to send liquid to one of the hydraulic cylinders are present. It can occur through registering of a pressure change, a valve opening or in any other way that shows that the industrial truck's 15 hydraulic functions are activated, for example in that one of the hydraulic cylinders of the industrial truck is moving.

The invention described above is applied on industrial trucks 15. An example of such a truck 15 is disclosed in FIG. 1. In the meaning of industrial truck is intended trucks that are material handlers. It has a load handling section and a drive section. The load handling section has generally a mast, but can also be without a mast. The load handling section comprises a fork pair. Generally two forks, but the fork pair should be interpreted as one or several forks. The fork pair can be lifted or lowered to handle a load. The lifting and lowering function is performed by means of hydraulic pistons 4, 40, 400. The fork pair is generally positioned on a fork carriage, but can also be designed such that a fork carriage is not needed, for example on a low lifting industrial truck. On certain industrial trucks the fork pair can be moved sideways. To push the forks sideways there are hydraulic pistons 4, 40, 400. On certain industrial trucks 15 the gap between the forks can optionally be adjusted. In this case this is also performed by means of a hydraulic piston or hydraulic pistons. On certain industrial trucks the load handling section comprises an operator cage. The operator cage can also have a function of movement in its entirety. Preferably this movement is performed by hydraulic pistons 4, 40, 400. Generally this movement is horizontal. In a variant of industrial trucks the fork pair can also be rotated essentially horizontally.

The driving section comprises functions for driving the industrial truck. The driving section comprises an energy source. The energy source is preferably a battery 17. The energy source could also be of another type, such as gasoline, diesel, gas or the like. However the invention is primarily intended for electrically powered industrial trucks having a battery 17 as an energysource.

The driving section comprises at least one drive motor. The drive motor is connected to one or several of the truck's wheels. Generally there is a gear between the drive motor and the drive wheel. Generally the drive motor is an electrical motor.

The driving section generally comprises control devices for maneuvering the industrial truck. These can be constituted of a tiller arm, a wheel or the like.

To this adds devices for maneuvering of the load handling section, these can be constituted of devices for lifting and lowering, tilting, and side movement of the forks, there can also be devices for changing the spread of the forks. The devices can be bars, wheels, buttons or the like. They can be separate for each function alternatively several functions are gathered in the same device. For larger industrial trucks, a driver compartment can be arranged. For smaller industrial trucks, such as tiller arm trucks, the driver walks with the industrial truck alternatively, travels on a platform behind the industrial truck.

When the industrial truck travels the driving section operates.

Figure 3:
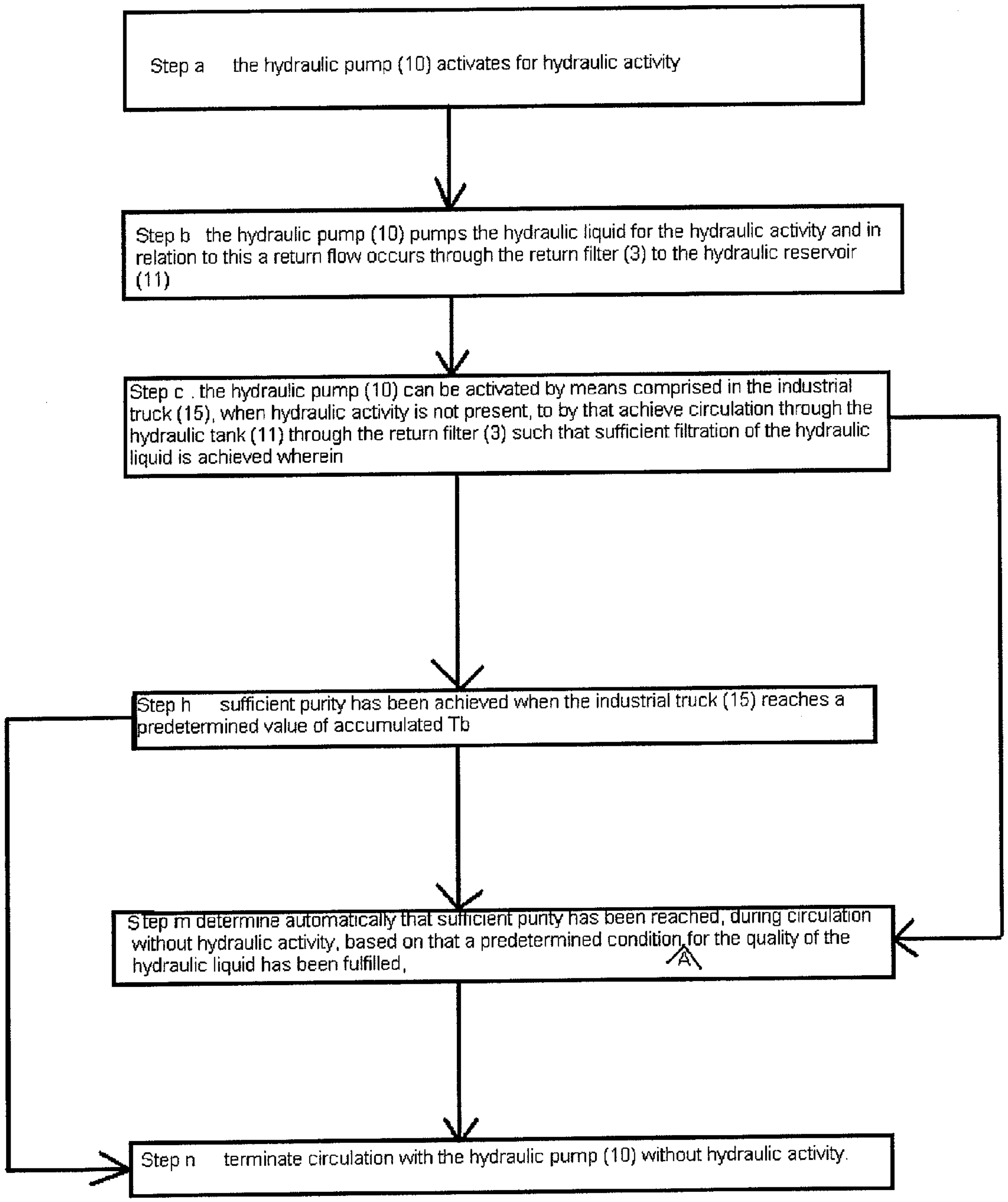
FIG. 3 Flow shaft of an embodiment according to the invention.

In the driving section the hydraulic pump 10 is generally present, as exemplified in the FIG. 3 above.

For certain industrial trucks the load handling section and the driving section is constituted by an assembly constituting a unity.

The industrial truck generally comprises an industrial truck computer 20. The industrial truck computer 20 comprises processor, RAM and ROM memory. The industrial truck computer 20 has a comprehensive ability to control the remaining electronic components of the industrial truck. The industrial truck computer 20 is hierarchically at the top of the industrial truck as far as the electronics are concerned and can be compared with a brain. It has the ability to store software and can execute this. According to what is mentioned above the industrial truck computer 20 is central and can comprise the said control unit 12.

The invention claimed is:

1. A method for cleaning hydraulic liquid in an industrial truck, wherein said industrial truck has an electrical motor, a battery as an energy source, and a hydraulic system including a hydraulic pump, a hydraulic reservoir, and a return pipe to the hydraulic reservoir with a return filter, wherein the method comprises the steps of:
 a. activating the hydraulic pump for hydraulic activity;
 b. using the hydraulic pump during hydraulic activity to pump hydraulic liquid for the hydraulic activity, with a return flow passing through the return filter to the hydraulic reservoir;
 c. activating the hydraulic pump when hydraulic activity is not present to circulate the hydraulic liquid through the hydraulic reservoir and through the return filter to effect filtration of the hydraulic liquid when hydraulic activity is not present; and continuing step (c) until a sufficient purity of the hydraulic liquid is achieved as determined by at least one of the following procedures I and II and then terminating step (c) upon determination of a sufficient purity of the hydraulic liquid being achieved;
 procedure I including:
  accumulating a time Tb for accumulated circulation time without hydraulic activity, and
  determining that the sufficient purity has been achieved when the industrial truck reaches a predetermined value of accumulated Tb; and
 procedure II including:
  using an industrial truck arranged sensor for measurement of a quality of the hydraulic liquid; and
  determining automatically that the sufficient purity has been reached during circulation without hydraulic activity based on a predetermined condition A for the quality of the hydraulic liquid being fulfilled.

2. The method according to claim 1, wherein the industrial truck is arranged to automatically determine that the cleaning of the hydraulic liquid is not sufficient.

3. The method according to claim 1, comprising the steps of:
 accumulating a time Ta for hydraulic activity; and
 determining when Ta has reached a predetermined value as an indicator that the hydraulic fluid is not sufficiently cleaned.

4. The method according to claim 3, comprising the steps of:
 automatically commencing step (c) when it has been determined that Ta has reached the predetermined value for cleaning of the hydraulic liquid; and
 resetting Ta.

5. The method according to claim 1, wherein Tb is reset when it has been determined that sufficient purity of the hydraulic liquid has been achieved.

6. The method according to claim 1, comprising the steps of:
 measuring of the quality of the hydraulic liquid; and
 automatically commencing step (c) when the measured quality of the hydraulic liquid does not fulfill a predetermined condition B for the quality of the hydraulic liquid.

7. The method according to claim 6, wherein said sensor is arranged to measure a particle content of the hydraulic liquid, and that the predetermined conditions A and B for the quality of the hydraulic liquid is constituted of particle content values.

8. The method according to claim 1, wherein performance of step (c) is precluded if a travel function of the industrial truck is activated.

9. A computer program product comprising computer readable code stored in a tangible medium, which computer readable code, when executed in an industrial truck's control unit, makes the industrial truck perform the method according to claim 1.

10. A control unit for an industrial truck, comprising the computer program product according to claim 9.

11. A control unit according to claim 10, which is an independent unit outside a central industrial truck computer.

12. A control unit according to claim 10, integrated in a central industrial truck computer.

13. The method according to claim 6, wherein said sensor is arranged to measure the particle content of the hydraulic liquid, and that the predetermined condition B for the quality of the hydraulic liquid is constituted of a particle content value.

14. The method according to claim 1, wherein at least procedure II is performed.

* * * * *